F. W. COLE.
ELECTROMECHANICAL VALVE MECHANISM FOR TIMING AND CONTROLLING BLASTS ON FIRE ALARM WHISTLES AND THE LIKE.
APPLICATION FILED MAY 28, 1917.

1,353,317.
Patented Sept. 21, 1920.
4 SHEETS—SHEET 1.

Witness,
H. B. Davis.

Inventor,
Frederick W. Cole
by
B. J. Noyes Atty

F. W. COLE.
ELECTROMECHANICAL VALVE MECHANISM FOR TIMING AND CONTROLLING BLASTS ON
FIRE ALARM WHISTLES AND THE LIKE.
APPLICATION FILED MAY 28, 1917.
1,353,317.
Patented Sept. 21, 1920.
4 SHEETS—SHEET 2.
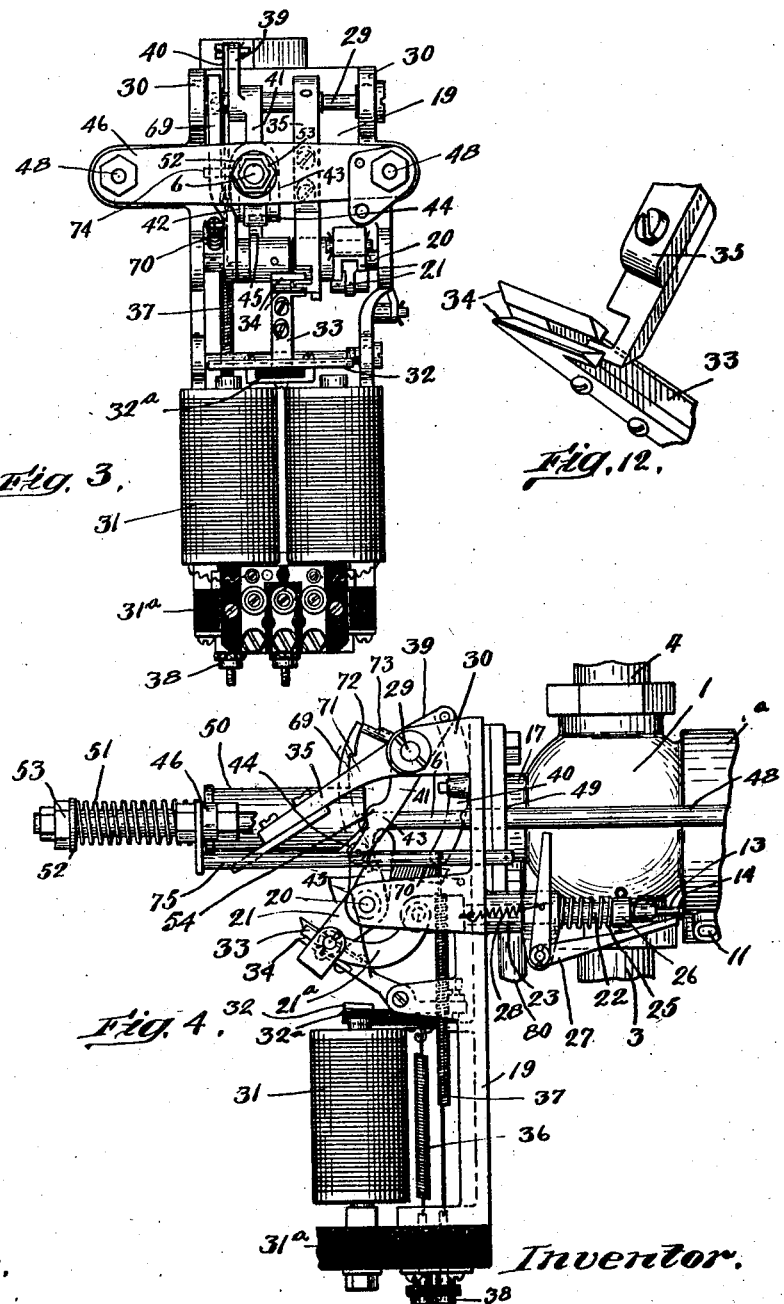
Witness.
H. B. Davis.
Inventor.
Frederick W. Cole
by
B. J. Noyes Atty

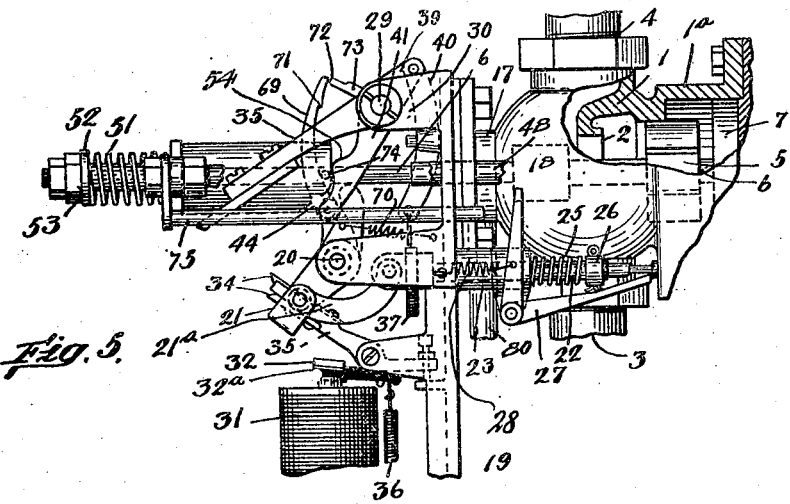

F. W. COLE.
ELECTROMECHANICAL VALVE MECHANISM FOR TIMING AND CONTROLLING BLASTS ON
FIRE ALARM WHISTLES AND THE LIKE.
APPLICATION FILED MAY 28, 1917.
1,353,317.
Patented Sept. 21, 1920.
4 SHEETS—SHEET 4.
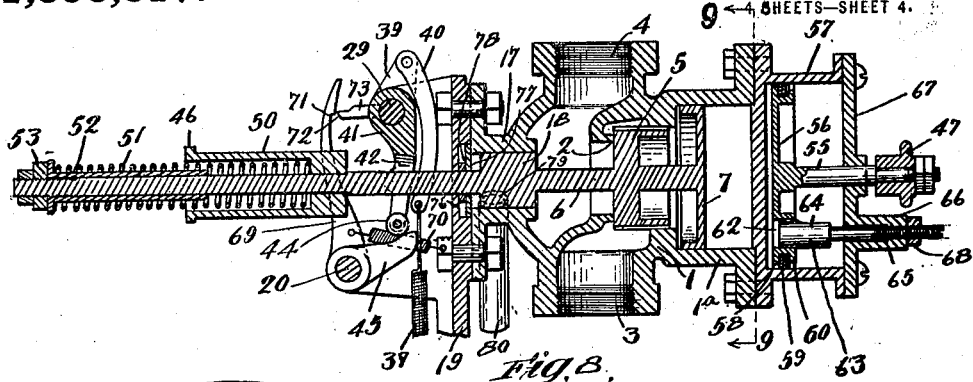
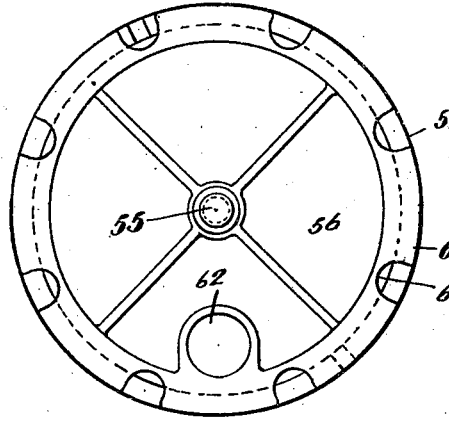
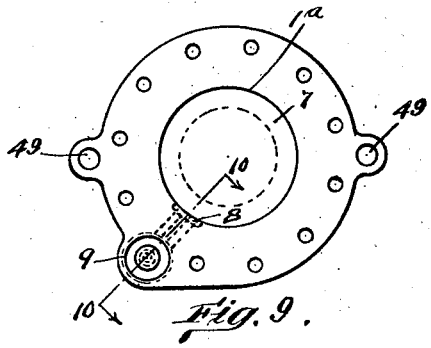
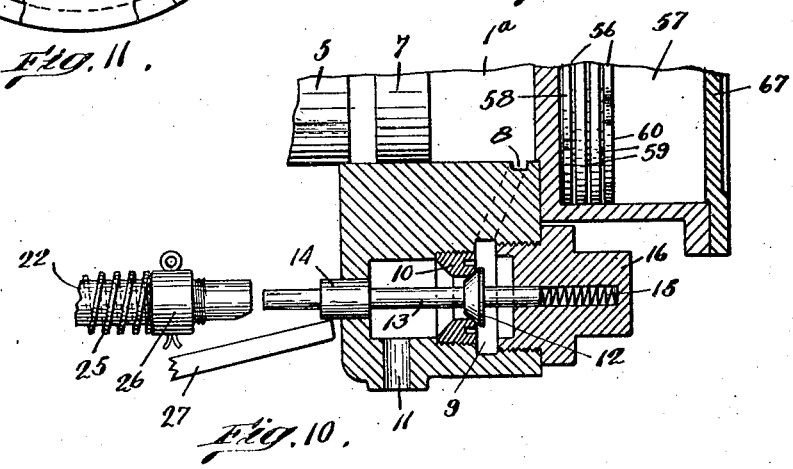
Witness.
H. B. Davis
Inventor,
Frederick W. Cole
by
B. S. Noyes Atty

UNITED STATES PATENT OFFICE.

FREDERICK W. COLE, OF NEWTON HIGHLANDS, MASSACHUSETTS, ASSIGNOR TO THE GAMEWELL FIRE ALARM TELEGRAPH COMPANY, OF NEWTON UPPER FALLS, MASSACHUSETTS, A CORPORATION OF NEW YORK.

ELECTROMECHANICAL VALVE MECHANISM FOR TIMING AND CONTROLLING BLASTS ON FIRE-ALARM WHISTLES AND THE LIKE.

1,353,317.          Specification of Letters Patent.       Patented Sept. 21, 1920.

Application filed May 28, 1917. Serial No. 171,375.

*To all whom it may concern:*

Be it known that I, FREDERICK W. COLE, a citizen of the United States, residing at Newton Highlands, in the county of Middlesex and State of Massachusetts, have invented an Improvement in Electromechanical Valve Mechanism for Timing and Controlling Blasts on Fire-Alarm Whistles and the like, of which the following is a specification.

This invention relates to an automatic electro-mechanical valve for timing and controlling the admission of steam, compressed air or the like to a diaphone, whistle, or other sound-producing instrument.

Valves of this character are preferably arranged to have the pressure of the air or steam hold the valve tight against its valve seat, and to provide a piston of larger diameter than the valve to be operated by the air or steam to lift the valve from its seat and to have the pressure of the steam or air to operate this piston controlled by a small controlling, or pilot valve which can be in turn operated electrically or electro-mechanically.

One object of this invention is to provide an improved mechanism for operating this controlling valve. In valves of this character, the operating mechanism is in turn controlled by the operation of an electromagnet included in an electric fire alarm circuit of low potential, so that the electric power available is comparatively small, and, therefore, the instruments to be controlled must be sensitive.

Another object of the invention is to provide a sensitively responding mechanism that will positively operate in response to the operations of the magnet, and in turn allow or cause positive prompt and reliable operation of the valve operating mechanism.

After the whistle valve is opened, it is essential that it shall stay open long enough to cause an efficient blast on the whistle. One of the objects of this invention is to provide positively operating and improved mechanism for insuring an efficient length of blast. After the blast has continued for a length of time to be efficient, it is desirable that it shall be immediately stopped, without regard to the condition of the controlling circuit. Another object, therefore, is to provide an improved efficient means whereby this is accomplished. It is desirable that, after the parts have operated to open the controlling valve, they shall be automatically restored and reset by the operation of the valve controlling piston, and without injury, as from pounding by its quick operation. Another object of the invention is to provide such means.

It is desirable that the valve operating and controlling mechanism shall not be required to be manually wound or require manual attention to enable it to be repeatedly operated in response to alarms. Another object of this invention is to provide improved means whereby this is accomplished from the operation of the valve operating piston.

After the operating parts have been restored, it is desirable that the device controlled by the magnet shall not be again operative until the whistle valve itself has again completely closed to bring to an end the noise of one blast completely before the valve could be again opened for another. One of the objects of the present invention, therefore, is to provide an automatic mechanical lock for the actuating parts and which will serve to hold the actuating means against possibility of release through influence of the external controlling means until the main valve is completely closed.

It is desirable that the operations of the whistle valve shall be prompt both in opening and closing, that the blasts shall be definite and clear. One of the objects of the invention is to provide means for accomplishing this end in a simple manner by the use of an improved form of dash pot which is operated in one direction by a spring compressed by the valve piston in opening and which, therefore, allows quick opening of the valve. This dash-pot piston is constructed for normal retardation in movement in one direction to time a blast after the valve is open, and for free operation in movement in the opposite direction when it is positively moved by the closing of the valve, the specific structure involving a piston constructed for non-leakage cylinder fit in movement in one direction and free leakage cylinder fit in the opposite movement. It is desirable that the time element of these valves shall be adjustable to meet the unit time of signals in the fire alarm systems in which they may be used, and one object of the invention is to provide such adjustable element to coöperate with the dash-pot piston to regulate its period of operation as desired. Where a mechanism is operatively connected to a valve for steam or air, it is important that moisture in the steam or compressed air should not become deposited on working parts to rust or injure them. Therefore, another object of this invention is to provide means for preventing such moisture to escape around the valve stem.

In the accompanying drawings:—

Fig. 3 is an end view.

Fig. 4 is a side elevation, the parts being shown in released or operating position.

Fig. 5 is a similar view, partly in section, showing the positions of the parts as the restoring mechanism starts the restoring action.

Fig. 6 is a similar view illustrating the positions of the parts at the end of the restoring action, with the mechanical lock in operative relation.

Fig. 7 is a detail illustrating particularly the means by which the mechanical lock is released in the return of the restoring mechanism to normal or initial position.

Fig. 8 is a longitudinal sectional view showing the interior arrangement of the main valve, dash-pot and related parts.

Fig. 9 is a section on line 9—9 in Fig. 8.

Fig. 10 is a sectional detail illustrating particularly the pilot valve and the means for operating and for locking the same, taken on line 10—10 Fig. 9.

Fig. 11 is an elevation of the piston on the dash-pot.

Fig. 12 is a detail of the double locking release controlled by the magnet.

Figure 1:
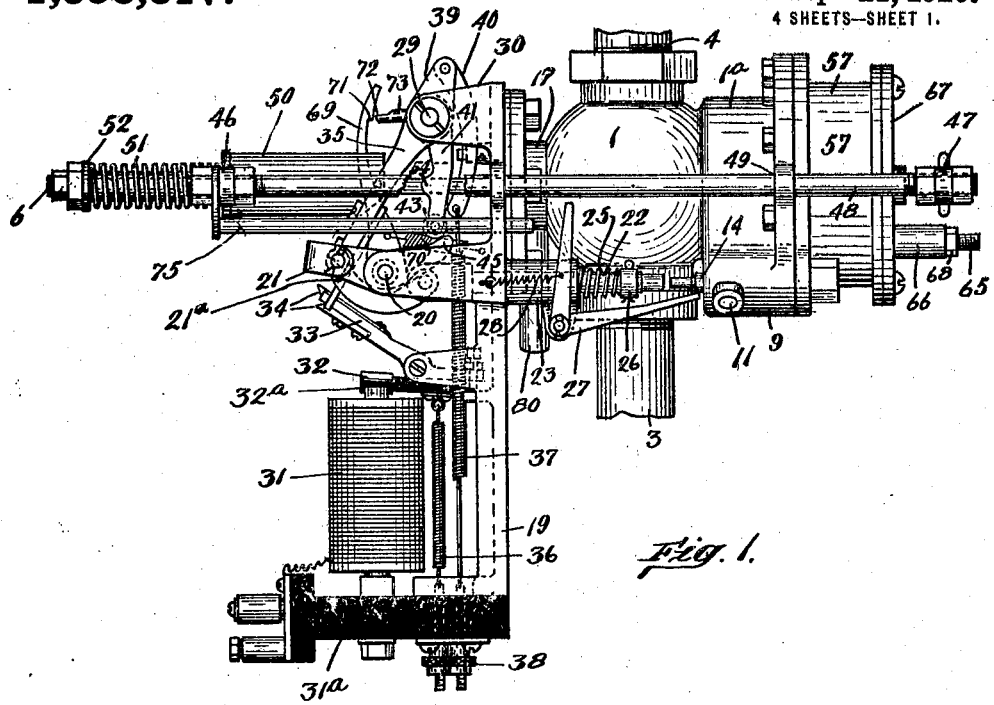
Figure 1 is a side elevation of the improved valve-controlling and coöperating parts.
Figure 2:
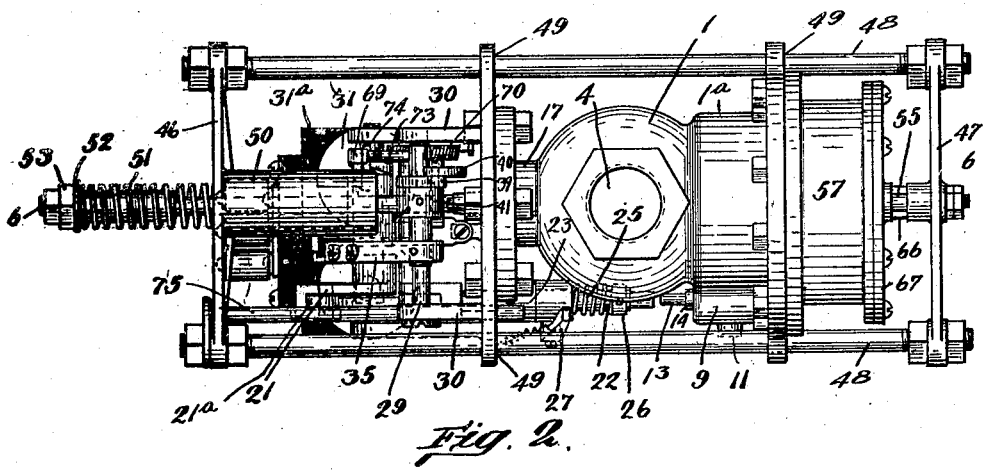
Fig. 2 is a plan of the same.

The main valve is here shown as of the general globe type comprising a casing 1 having an intermediate valve seat 2 and an inlet 3 and outlet 4 at opposite sides of said seat. The main valve 5 is fixed upon a valve stem 6, said main valve having a solid end which may be packed or otherwise fitted to coöperate with the seat 2.

The valve case 1 is fitted or formed with an extension 1ª forming a cylinder, open to the inlet pressure, and in which is arranged an operating piston 7, of much larger diameter than the valve, and which is secured upon the valve stem. There is a restricted leakage fit between this piston and the cylinder to normally allow a balance of pressure at each side thereof. The cylinder 1ª, see Fig. 10, communicates at the end remote from the inlet 3, with a relief port 8 opening into a relief cylinder 9, arranged as an offset to the cylinder 1ª. The cylinder 9 is interiorly provided with a removable seat 10, arranged between the relief port 8 and the outlet 11 from the relief cylinder to the atmosphere. The relief valve 12 is secured upon a valve stem 13 slidably arranged in the relief cylinder and near the relatively forward end is provided or formed with a collar 14 slidably guided in an opening in the cylinder wall to serve as a closing piston for the valve, and at its outer end or shoulder to serve as an abutment for locking the relief valve in open position. This valve is closed by a spring 15, bearing against one end of the stem, and seated in a channel in a plug 16, removably closing the rear end of the relief cylinder.

The main valve case is formed in advance of the valve, that is, on the outlet side of the valve casing with an extension 17 forming a cylinder in which is arranged a piston 18 open to the outlet pressure side of the main valve, and serving under restoring conditions to receive the pressure of the steam or air to close the main valve. The forward end of the main valve casing is closed by supporting plate or frame 19 on which the operating parts are mainly located, this plate being shown as depending some distance below the main valve casing. An operating shaft 20 is mounted in ears projecting forwardly from the side edges of the plate and adjacent one end has a toggle lever connection, through sections 21, 21ª, with a spring-pressed relief valve operating rod 22, slidably mounted in a sleeve extension 23 of the plate, and arranged in line with the relief valve stem 13, as clearly shown in Figs. 5 and 10. The relief valve actuating rod is moved, to open the valve, by a spring 25 bearing between the guide sleeve of the rod and the collar 26, adjustably secured upon the rod, the rod being of such length that, when the rod is withdrawn and the relief valve closed, the adjacent ends of the parts are immediately adjacent, but avoid direct contact. This rod is held withdrawn when the three pivotal points of the toggle levers 21 and 21ª, which form a link connection from the lever 21 to the operating rod 22, are substantially in line, as shown in Fig. 6. This is their normal condition, and, therefore, the compression of the spring 25 is easily held and with but a small turning force to the operating shaft 20 on which lever 21 is mounted. This construction also allows easy restoration of this shaft, for, when the spring can exert the greatest leverage, it is in its most extended condition, and when it is most compressed, the levers are working at their greatest advantage. This construction allows the fullest force of the spring to open the valve because the operating or holding shaft 20, when once released, is perfectly free to move and without restraining influence against the valve opening spring.

Secured upon an extension of the sleeve 23 is an L-shaped locking lever or latch 27, the free end of one arm of which is adapted, when the relief valve is open, to be moved by a spring 28, connected to the remaining arm of the lever and to the frame, to engage in advance of the locking collar 14 on the relief valve to hold said valve in open position, as clearly shown in Fig. 5. A resetting shaft 29 is rotatably supported in ears 30, projecting forwardly from the frame plate 19 above the operating shaft. This shaft supports the parts by which the mechanism is locked initially against operation, and through which said parts are restored. The improved valve is here shown for specific use in giving a fire alarm signal, under which circumstances the external control will be from signal impulses governed by a remote signaling apparatus, operating through an electromagnet as 31, mounted upon the upper face of an insulating block 31ª, supported on the plate 19 against the same face. The electromagnet has an armature 32 mounted on an insulating block 32ª which is fastened to a lever 33 terminally formed to provide what is well known as a double lock 34, illustrated more particularly in Fig. 12 of the drawings. The mounting of these parts on the same face of a flat insulator, as slate, insures their always being in line without regard to variations in thickness of the insulator. Secured upon the resetting shaft 29 is a locking arm 35, having one terminal formed for coöperation with this double lock terminal 34 of the lever 33, carried by the armature of the electromagnet.

The resetting shaft, when released, as by the breaking of the normally-closed signal circuit, is moved in the operative direction, as shown by Fig. 5, under the influence of a spring 37. The upper end of this spring connection is, in effect, in the form of a toggle, with one section 39 secured to the resetting shaft, while the other section 40 is connected to the free end of the section 39 and to the spring. The section 39 has such radial disposition with the locking shaft 29, that, with the parts in normal or locked positions, the pivotal point between the section 39 and section 40, and of the latter with the spring, will be nearly but not quite in line with the pivots of shaft 29. The normal tendency of the spring to turn the shaft through this connection is, therefore, comparatively small, and hence there is a comparatively small load on the armature of the magnet, permitting said armature to move positively and freely in response to the magnet.

The resetting shaft carries a resetting and holding arm 41, preferably integral with the section 39, which resetting arm is preferably divided at its lower end to form spaced sections 42 and 43, see Fig. 3, which sections are arranged on opposite sides of and depend below the operative plane of the valve rod, and are preferably connected in a manner to support a roller 44. The operating shaft 20 has an arm 45 secured thereto and adapted to engage with this roller 44 of the resetting arm to be reset thereby, and the coöperation of these arms in normal restored positions serves to prevent movement of the operating shaft while the resetting shaft is held by the armature of the controlling magnet.

The main valve rod extends through the plate 19 on a plane between the respective resetting and operating shafts, and slidably mounted on the rod is the resetting member which normally abuts against a shoulder on the piston rod which holds it in a forward restored position. The resetting member comprises end yokes 46 and 47, adjustably connected to rods 48, which rods are slidably mounted in appropriate bearing openings 49 in the structure. The forward yoke 46 on the resetting member has a central sleeve extension 50, through which the main valve rod is adapted to pass, and the sleeve 50 abuts against a shoulder on the valve rod. This sleeve constitutes the housing for an operating spring 51, which terminally seats within said housing bearing at one end against the inner end of the housing, and at the opposite end against a spring retainer 52, loosely encircling the main valve rod, at the free end thereof and adjustably held thereon, by a nut 53, engaging the threaded terminal of the rod. The relatively near or inner end of the spring housing 50 constitutes a solid face, adapted in the movement of the resetting member to engage projections 54 on the forward edges of the resetting arm, after the main valve has opened carrying its stem forward, so that its shouldered part has moved away from the end of the resetting device. The outer end of the valve stem compresses the spring inside the housing to cause it to in turn drive the restoring device forward to operate the arm 41 in a resetting direction upon the opening of the main valve.

As this arm 41 is moved forward, its roller 44 will engage the arm 45 and return the operating shaft 20 to its normal position. The toggle link connection 21ª to the arm 21 also restores the operating rod 22 of the relief valve and thereby compresses its operating spring 25, leaving the relief valve locked in its open position, held there by its L-shaped locking lever or latch 27.

The resetting member carries a rod 75, secured to its forward yoke 46, and this rod extends through an opening in the plate 19, and the upper end portion of the latch or L-shaped locking lever 27 is arranged in the path of movement of this rod. This rod is of such length, that contact is had to move the locking lever 27, and release or unlock the relief valve for automatic closing, just prior to the full forward movement of the resetting member. The closing of the relief valve will, of course, follow, and the balance of pressure will be restored around the large piston connected to the main valve, and permit the pressure acting against the closing piston 18 to close the main valve.

As heretofore stated, one of the objects of the present invention is the provision of a mechanical lock for securing the operating parts in reset relation against possibility of further control by the external governing means, in this instance the electromagnet, until the main valve is itself closed. To provide this lock there is arranged loosely upon the operating shaft 20 a lever 69, moved toward an operative position by a spring 70. The upper end of the lever is notched at 71, to coöperate with a square terminal 72, of a locking pin 73, projecting from the resetting shaft 29. The spring housing 50 of the resetting member, is provided with a laterally projecting pin 74, see Fig. 7, arranged in front of and in the path of the lever 69 to hold the lever 69 out of engagement with the pin 73 when the main valve is closed. As the resetting member moves operatively, under the influence of its spring, when the parts are being reset, and after the lever 35 has been restored past the double locking projections 34 on the armature lever and before the relief valve is unlocked, the locking pin 73 rides into locking coöperation beneath the notch 71 of lever 69, which lever 69 has then been permitted by the forward movement of the pin 74 to be moved by its spring 70 into the path of this locking pin 73 of the resetting shaft, as shown in Fig. 6. After the relief valve has been unlocked and has closed, and while the resetting member is being moved in its reverse direction by the shoulder on the stem of the main valve in closing, the notch 71 of the lever 69 will catch the square terminal 72 of the locking pin 73, and hold the resetting shaft 29 and locking bar 35 from returning to their normal position until the resetting member is again moved to nearly the limit of its movement, by the closing of the main valve, when the pin 74 engages and moves the lever 69 to release the locking pin. The locking bar 35, while under the mechanical lock of lever 69, is slightly beyond the locking influence of the double lock controlled by the armature, so that when said mechanical lock is released, the lever 33 is only then permitted to move so as to be again within the influence of the double lock controlled by the armature, and the parts are then reset and in their normal position ready for another operation in response to a signal.

A whistle valve to be efficient for fire alarm signals must not only open promptly and fully, but must thereafter remain so open a certain length of time to allow a proper blast and must then close promptly to clearly define the blasts. This valve opens promptly as its forward movement is not retarded, and, in its forward movement, compresses a spring which in turn causes the operation of timing and resetting devices, and it will remain open until they have properly operated. In order to get a proper timing of the length of blast to give best results in the system of which the valve may form a part, there is provided, as part of this valve controlling mechanism an improved form of dash-pot, and the rear yoke 47 of the resetting member is connected to the stem 55 of this dash-pot piston 56. The piston is mounted for movement in a dash-pot cylinder 57, secured to the end of the balance cylinder 1$^a$, the head of the dash-pot cylinder providing an end wall for the balance cylinder. The movement of the resetting apparatus in restoring the operating levers to normal is in the same direction as the opening movement of the main valve, and is retarded in this operation by the dash-pot. This resetting movement is gained through the spring 51, which is put under tension to move the resetting member, when the balance on the operating piston of the main valve is destroyed and said main valve is moved to open position.

As the resetting member resets the mechanism in its travel following the opening of the main valve, it is apparent that the main valve must remain open at least throughout a corresponding period of time. Furthermore, it is desirable that, in returning the parts, that is, the resetting member and the valve stem to a normal position after a resetting operation, the dash-pot piston be practically free to move in such direction, being retarded only in the opposite direction. The improved dash-pot, therefore, is constructed with a view to insuring a particular retardation in movement of the dash-pot in one direction and a comparatively free movement in the opposite direction, and is provided with manually adjustable means, whereby the pressure serving to retard the dash-pot in such movement may be relieved at any or practically any desired point in the travel of the dash-pot piston. Under these circumstances, the period necessary for an operation of the resetting member, and hence the period at which the main valve will remain open may be readily regulated in accordance with specific requirements of the system in which it is used. This dash-pot piston comprises a circular plate-like body having a peripheral channeled edge 58. In the channel are arranged suitable packing elements, such for example, as split piston rings 59. The width of the channel, as compared with the combined similar dimension of the rings or other packing, permits a limited free play of the packing axially of the piston. One wall of the channel 58, that is, the wall against which the piston rings will bear in the retarded movement of the piston, is of true circular shape having an unbroken peripheral edge, substantially coextensive with the diameter of the cylinder. The opposite piston wall 60 of such channel, or that wall against which the packing rings will bear in what is desired as a free movement of the dash-pot piston, is formed with a series of depressions or openings 61, of any desired shape, which extend below the packing rings. The dash-pot piston thus presents an unbroken full diameter wall against which the packing rings contact in the retarded movement of the dash-pot, serving to prevent free air leakage around the piston; the opposite wall, however, permits free passage of air under and past the rings in the movement of the piston in the return direction, so that such return movement is comparatively free. At an appropriate point, the dash-pot piston is also formed with an opening 62, constituting a port or passage from one side of the piston to the other, through the piston. A time limit member coöperates with this opening in the piston, such member comprising a head 63, which, for a portion of its length, snugly fits the port 62, to prevent the passage of air therethrough. The remaining length of the head is cut away at 64, so that when the piston reaches a position to permit the cut-away portion 64 of the time limit member to register with the inner face of the piston, an air leak will be provided which will then allow free passage of the air from one to the other side, and avoid further retardation. This time-limiting member is provided with a stem 65, threaded in a sleeve extension 66, projecting from a head 67, removably arranged to entirely close the dash-pot cylinder. The actuating end of the stem 65 is provided with a lock nut 68, whereby it may be locked in position after manual adjustment. Obviously, the adjustment of the time-limiting member axially of the cylinder will determine the point in the travel of the piston at which the retarding pressure will be relieved. Therefore, the time limit of the operative movement of the resetting member and of the main valve, and the blast, may thus be easily and accurately governed. The head 67 effectively closes the dash-pot cylinder and prevents possibility of dust and dirt from depositing around the piston within the cylinder to destroy its efficiency, which is an important feature where a dash-pot must stand exposed continuously and without manual attention, and yet must be always ready for correct working.

The timing element of this valve is not only of value in causing a proper blast for an alarm, but in retarding, as it does, the restoring or resetting mechanism to insure that such parts will not be injured or destroyed by any excessive pounding from sudden resetting operations, and it thus insures enduring, reliable, and efficient service from the valve.

In a valve operating and controlling mechanism of this type, where such mechanism is secured directly to the valve casing, or in proximity to the valve stem by which it is operated, there is a liability of the steel and iron parts becoming rusted, and their efficiency destroyed, due to moisture from the steam or compressed air escaping around the piston valve stem, and coming into contact with them each time the valve is operated. As a means to prevent the air or steam flowing past the valve 18 and reaching the working parts of the mechanism on the plate 19, the said plate, in alinement with the valve cylinder 17, and concentric with the opening for the main valve rod, is recessed at 76, and within the recess and about the main valve rod is arranged a split packing ring 78, which, of its own spring action, hugs the valve rod and is pressed tightly against the side wall when the valve is opened, to thereby prevent passage of moisture around the stem. Furthermore, the piston cylinder 17 is formed in its forward portion with a large relief outlet 79, communicating with an exhaust pipe 80, to give free outlet to whatever moisture may pass through piston 18, thus preventing pressure against the ring of enough force to drive moisture out past the piston stem and against the working parts of the mechanism.

In the normal and unoperated condition of the valve mechanism above described the electromagnet 31 is energized to hold the resetting arm 41 in the position shown in Fig. 1 and the toggle associated with the pilot valve operating mechanism is in its closed position and the pilot valve is closed by its controlling spring 15, and said toggle members are restrained in such position by arm 41 controlled by the locking arm 35. The valve 5 is held on its seat by an equal pressure of steam that is maintained on each side of the valve operating piston 7 by the leakage past said piston. The dash pot piston 56 is at the lower part of its stroke as shown in Fig. 8, being moved into and held in such position by said valve 5 or its stem 6. Upon a break of the electric circuit controlling the electromagnet, as during the sending of a signal over said circuit and the consequent deënergization of said electromagnet the armature 32 is permitted to retract to unlock the locking arm 35. Said locking arm is consequently moved by its spring 37 into an operated position and the roller 44 carried by the arm 41 is moved away from the cam 45 secured to the operating shaft 20 controlling the pilot valve. The toggle members 21 and 21ᵃ are consequently permitted to move, by the spring 25, into open position to permit the pilot valve operating member 22 to move upwardly to engage the pilot valve stem 13 to consequently move the pilot valve 12 from its seat. This operation permits the steam to escape from the space between the cylinder 1ᵃ and the top of the piston 7 to cause the unbalancing of the main valve 5 which is thereby moved upward to permit steam to flow through the valve and the blast to be sounded. As said pilot valve is moved upward, the enlarged portion 14 of the stem of said valve is moved past the end of the locking member 27 and said locking member is moved by its spring under said enlarged portion to thereby maintain the pilot valve off its seat to hold the main valve 5 off its seat for the sending of a blast of efficient length.

When the main valve 5 is moved upward by the unbalancing of the piston 7 the spring 51 surrounding the stem of said valve is compressed and at the same time the enlarged portion of said valve stem is moved away from the tube or sleeve 50 of the yoke 46. The compression of said spring 51 serves to actuate said yoke 46 and the rods 48 secured thereto to move the piston 56 of the dash pot upward within the cylinder 57 which movement is retarded by said dash pot until the slotted portion 64 of the pin 63 is adjacent the lower end of the face of said piston 56 whereupon an unrestricted flow of air into the space between said piston and the cylinder of the dash pot is permitted and the piston and associated mechanism may be consequently rapidly moved upward by the spring 51.

When the tube or sleeve 50 approaches the limit of upward movement, it engages the projections 54 of the arm 41 and during the further inward movement serves to move said arm toward the body of the main valve and moves the arms associated therewith into the position shown in Fig. 1.

Said arm, in its resetting movement, engages through the cam roller 43 the cam arm 45 of the operating shaft 20 and serves to return the operating mechanism and the toggle members 21 and 21ᵃ to their normally closed position. The locking arm 35 in moving into its resetting position engages the arm 33 controlled by the electromagnet 31 and is locked with said arm 33 to be unlocked therefrom upon a second deënergization of said magnet. In the unoperated position of said tube or sleeve 50 the locking arm 69 is held by the pin 74 carried by said sleeve 50 from coöperation with the resetting arm 41, as is shown in Fig. 7.

When, however, said sleeve 50 is moved inwardly and nears the limit of its extreme inward movement, said locking arm 69 is moved by its spring 70 into locking engagement with the pin 73 secured in said shaft 29 to thereby hold the resetting arm against a second movement or its release by the electromagnet 31 until the component parts of the valve mechanism are again entirely reset.

The final movement of the yoke by said spring 51 serves to move the rod 75 into engagement with the latch 27 thereby moving it from coöperation with the enlarged portion 14 of the stem of said valve and consequently permitting said valve to close. Due to leakage of steam around said piston 7, the balance of pressure is now restored on each side of said piston and the main valve 5 is closed. In its closing movement it moves the mechanism associated therewith into a normal and unoperated position as shown in Fig. 1 in readiness for a second operation.

I claim:—

1. A valve mechanism for controlling the flow of elastic fluid, including a normally closed valve, means normally biased to closed position to govern the opening and closing of said valve, means to open said governing means, and a time element actuated through a movement of said valve to open position to govern the subsequent duration of opening of said governing means.

2. A valve mechanism for controlling the flow of elastic fluid, including a normally closed valve, means normally biased to closed position to govern the opening and closing of said valve, means to open said governing means, and means actuated through a movement of said valve to open position to delay the closing of said governing means.

3. A valve mechanism for controlling the flow of elastic fluid, including a normally closed main valve, means normally biased to closed position to govern the opening and closing of said valve, said means including a pilot valve, means responsive to external control to cause the operation of said governing means to move the pilot valve to open position to cause said main valve to move to open position, means to lock said pilot valve in open position during a movement of said main valve to open position and for a period of time thereafter, means actuated through movement of said main valve to open position to delay the unlocking of said pilot valve and subsequently permit said pilot valve to close to cause the closing of said main valve.

4. A valve mechanism for controlling the flow of elastic fluid, including a normally closed main valve, a pilot valve biased to closed position for governing the movements of said main valve, means responsive to external control to cause the opening of said pilot valve to cause a movement of said main valve to open position, and resetting means operable subsequent to a movement of said main valve into open position to reset the pilot valve.

5. A valve mechanism for controlling the flow of elastic fluid, including a normally closed main valve, a pilot valve normally biased to closed position for governing the movements of said main valve, operating means for said pilot valve normally biased for open position of said pilot valve, said operating means being normally locked in closed position, means for releasing the lock on said operating-means to open said pilot valve to cause said main valve to move to open position, and resetting means for said operating means operated through a movement of said main valve.

6. A valve mechanism for controlling the flow of elastic fluid, including a main valve, a pilot valve for controlling the operation of the main valve, means for opening the pilot valve through an external control, a main valve resetting means, operating in one direction to control closing movement of the pilot valve and reset the pilot valve opening means, and a lock to secure the pilot valve opening means against movement through external control during the return of the resetting means to substantially full normal position.

7. A valve mechanism for controlling the flow of elastic fluid, including a normally closed main valve, a pilot valve normally biased to closed position for governing the movement of said main valve, means to open said pilot valve, locking means tending to maintain said pilot valve in open position when opened, and means operated by a movement of said main valve and including a time element for delaying the releasing of said lock after movement of said main valve into open position to permit said pilot valve to return to closed position.

8. A valve mechanism for controlling the flow of elastic fluid, including a normally closed main valve, a pilot valve normally biased to closed position for governing the movement of said main valve, operating-means for said pilot valve normally restrained from operation, releasing-means for said operating-means, locking-means adapted to maintain said pilot valve in open position subsequent to the opening of said main valve, resetting-means for said operating-means operated through movement of said main valve to open position, and time-controlled releasing-means for said locking-means, whereby said pilot valve may be permitted to close, to cause the closing of said main valve.

9. A valve mechanism for controlling the flow of elastic fluid, including a normally closed main valve, a pilot valve normally biased to closed position for governing the movement of said main valve, pilot valve operating mechanism, an operating member, links comprising toggle members pivotally connected to said operating mechanism and member, and time-controlled means for governing the closing of said pilot valve.

10. A valve mechanism for controlling the flow of elastic fluid including a normally closed main valve, a pilot valve normally biased to closed position for governing the movement of said main valve, and operating mechanism for said pilot valve, said mechanism including toggle members maintained in normal closed position to permit said pilot valve to be closed, means for normally restraining said operating mechanism in closed position and responsive to external control for releasing said operating mechanism to cause said mechanism to open said pilot valve, and means operated through movement of the main valve to reset said operating means.

11. A valve mechanism for controlling the flow of elastic fluid including a normally closed main valve, a pilot valve for controlling the opening and closing of said main valve, means responsive to external control to open said pilot valve to cause the opening of said main valve, resetting means for the aforesaid means operated through movement of said main valve, and means to lock the external control responsive means against subsequent external control arranged to release the lock on said responsive means subsequent to the closing of the main valve.

12. A valve mechanism for controlling the flow of elastic fluid, including a normally closed main valve, means for controlling the opening and closing of said valve, means responsive to external control for operating the aforesaid means, locking-means for the external control responsive means operated to lock said means through a movement of the valve in one direction, and operated through a movement of the valve in the other direction to unlock said means.

13. A valve mechanism for controlling the flow of elastic fluids, including a normally closed main valve, governing means for said main valve, means responsive to external control to release said governing means to cause the opening of the main valve, resetting means for said governing means operated through a movement of said main valve, and means operative to lock said governing means in its reset position and to unlock said governing means only when said main valve is in its closed position.

14. A valve mechanism for controlling the flow of elastic fluids, including a main valve, governing means for said valve, and locking means for said governing means operated to lock said governing means through movement of the valve in one direction and to unlock said governing means through movement in the other direction.

15. A valve mechanism for controlling the flow of elastic fluid, including a main valve, a pilot valve for controlling the opening and closing of said main valve, operating mechanism for said pilot valve, means responsive to external control to cause the operation of said operating mechanism to open said pilot valve to cause the opening of said main valve, resetting means for said operating mechanism and said external control responsive means operated through a movement of said main valve to open position, means operated through a movement of said main valve to open position, to lock said operating mechanism and said external control responsive means and operative through movement of said main valve to closed position to unlock said mechanism and said responsive means.

16. A valve mechanism for controlling the flow of elastic fluid, including a main valve, a pilot valve for said main valve, means responsive to external control to cause the opening of said pilot valve to cause a movement of said main valve to open position, means to lock said pilot valve in open position, and means actuated through a movement of said main valve to subsequently open position to release the locking means of said pilot valve.

17. A valve mechanism for controlling the flow of elastic fluid, including a main valve, controlling means for said valve, and means including a time element operated through a movement of said valve to open position to subsequently operate said controlling means to cause the closing of said main valve.

18. A valve mechanism for controlling the flow of elastic fluid, including a main valve, governing means for said valve, and controlling means for said governing means including a time element adapted to be operated through a movement of said valve into open position to cause the closing of said main valve after a period of rest in full open position.

19. A valve mechanism for controlling the flow of elastic fluid, including a main valve, controlling-means therefor, a bracket by which said controlling-means is supported, said bracket having an attaching face a predetermined distance below said controlling means adapted to receive a plate of insulating material of variable thickness, a plate of insulating material received on said attaching face, an electro-magnet for said controlling means carried by said insulating plate on the face thereof to which said bracket is secured, said electro-magnet having a predetermined height and position with respect to said controlling means, said arrangement comprising means whereby variations in the thickness of said insulating plate do not affect the relative positions of said magnet and controlling means and whereby said magnet is insulated from said valve mechanism.

20. A valve mechanism for controlling the flow of elastic fluid, including a main valve, a pilot valve, operating-means for said pilot valve including toggle members in normally closed position, a spring normally tending to open said toggle, locking-means for said operating-means, a spring normally tending to release said locking-means, and externally controlled means for said locking means, said locking-means and spring and operating-means being so disposed in normal position as to impose but slight strain upon said externally controlled means.

In testimony whereof, I have signed my name to this specification, in the presence of two subscribing witnesses.

FREDERICK W. COLE.

Witnesses:
GEORGE E. KING,
DANIEL J. FARMAN.